US012690075B2

(12) United States Patent
Watanabe

(10) Patent No.: US 12,690,075 B2
(45) Date of Patent: Jul. 21, 2026

(54) COMMUNICATION APPARATUS AND CONTROL METHOD

(71) Applicant: CANON KABUSHIKI KAISHA, Tokyo (JP)

(72) Inventor: Kenta Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 18/374,094

(22) Filed: Sep. 28, 2023

(65) Prior Publication Data

US 2024/0114564 A1     Apr. 4, 2024

(30) Foreign Application Priority Data

Sep. 29, 2022     (JP) ................................. 2022-156466

(51) Int. Cl.
*H04W 76/10*          (2018.01)
*H04N 23/63*          (2023.01)
(Continued)

(52) U.S. Cl.
CPC .......... *H04W 76/10* (2018.02); *H04N 23/631* (2023.01); *H04N 23/661* (2023.01); *H04N 23/667* (2023.01); *H04W 84/12* (2013.01)

(58) Field of Classification Search
CPC .... H04W 76/10; H04W 84/12; H04N 23/631; H04N 23/661; H04N 23/667
See application file for complete search history.

(56) References Cited

U.S. PATENT DOCUMENTS 9,477,432 B2 * 10/2016 Sato .................. H04M 1/72415
9,823,888 B2    11/2017 Kawasaki
(Continued)

FOREIGN PATENT DOCUMENTS

| JP | 2016-042656 A | 3/2016 |
| JP | 2016-054391 A | 4/2016 |

(Continued)

OTHER PUBLICATIONS

Japanese Office Action dated May 18, 2026, in related Japanese Patent Application No. 2022-156466.

*Primary Examiner* — Abdullahi Ahmed
(74) *Attorney, Agent, or Firm* — VENABLE LLP

(57)          ABSTRACT

A communication apparatus connects to an external apparatus and generates operation information for operating the external apparatus on a basis of predetermined information. The predetermined information is stored and operation information is generated or the operation information is generated without storing the predetermined information. The predetermined information includes identification information of the external apparatus, and in a case where the operation state is in a first state the predetermined information is stored as registration information of the external apparatus, and generates first operation information which is a screen for operating the external apparatus based on the registration information. In a case where the operation state is in a second state, second operation information is generated which is a notification screen prompting the user to operate the external apparatus without storing the predetermined information as registration information of the external apparatus.

12 Claims, 9 Drawing Sheets

(51) Int. Cl.
 *H04N 23/661* (2023.01)
 *H04N 23/667* (2023.01)
 *H04W 84/12* (2009.01)

(56) References Cited

U.S. PATENT DOCUMENTS

| | | | | |
|---|---|---|---|---|
| 10,129,431 B2 * | 11/2018 | Yasuzaki | | H04N 1/33323 |
| 10,257,337 B2 | 4/2019 | Harada et al. | | |
| 2016/0014322 A1 * | 1/2016 | Kimura | | H04N 23/667 |
| | | | | 348/211.4 |
| 2017/0295399 A1 * | 10/2017 | Matsuda | | H04N 5/0733 |
| 2019/0306698 A1 * | 10/2019 | Goto | | H04W 4/00 |
| 2021/0307109 A1 * | 9/2021 | Ikeda | | H04W 36/035 |
| 2021/0377820 A1 * | 12/2021 | Lida | | H04W 76/10 |
| 2022/0346164 A1 * | 10/2022 | Watanabe | | H04W 4/80 |
| 2024/0114409 A1 * | 4/2024 | Yoshida | | H04W 36/03 |

FOREIGN PATENT DOCUMENTS

| | | | |
|---|---|---|---|
| JP | 2017-085518 A | 5/2017 | |
| JP | 2017-184184 A | 10/2017 | |

* cited by examiner

F I G. 1A
100
111
CONNECTION UNIT
101
CONTROL UNIT
102
IMAGE CAPTURING UNIT
103
NON-VOLATILE MEMORY
104
WORKING MEMORY
105
OPERATION UNIT
106
DISPLAY UNIT
112
SHORT-RANGE WIRELESS COMMUNICATION UNIT
RECORDING MEDIUM — 110
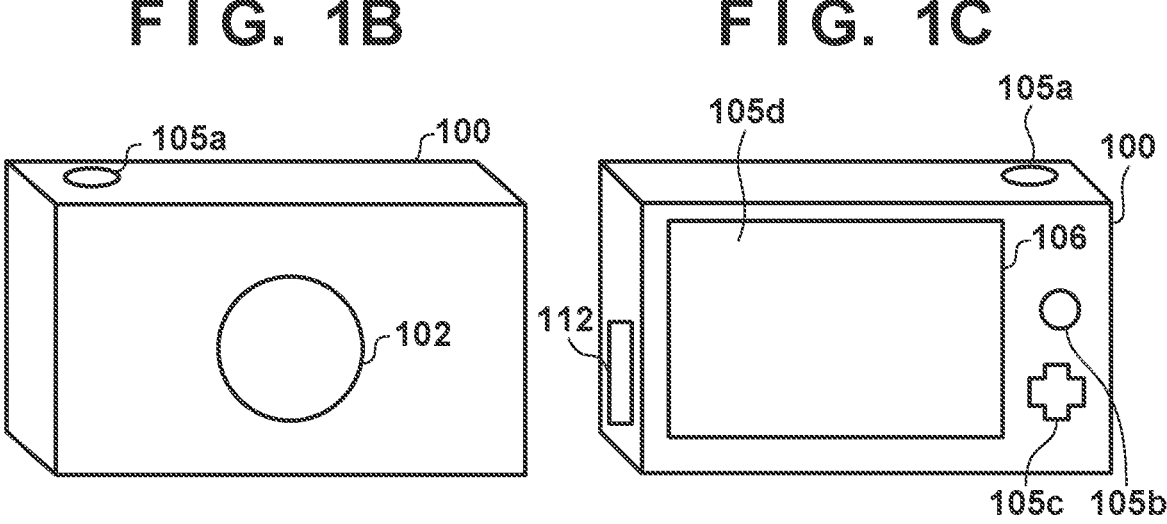
F I G. 1B          F I G. 1C

F I G. 3

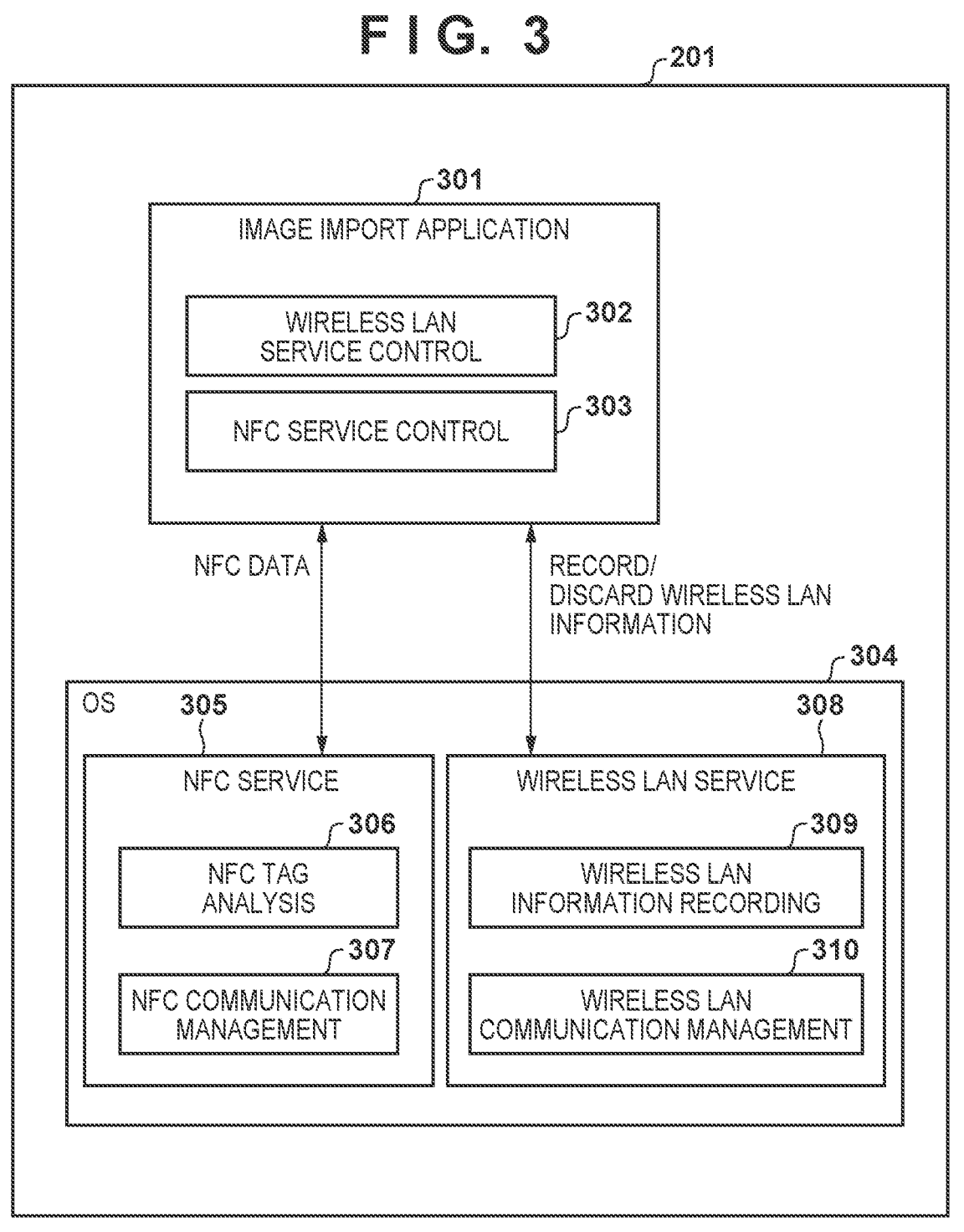

201

301

IMAGE IMPORT APPLICATION

| WIRELESS LAN SERVICE CONTROL | 302 |

| NFC SERVICE CONTROL | 303 |

↕ NFC DATA

↕ RECORD/ DISCARD WIRELESS LAN INFORMATION

304

OS          305                                    308

| NFC SERVICE | WIRELESS LAN SERVICE |

306

| NFC TAG ANALYSIS |

309

| WIRELESS LAN INFORMATION RECORDING |

307

| NFC COMMUNICATION MANAGEMENT |

310

| WIRELESS LAN COMMUNICATION MANAGEMENT |

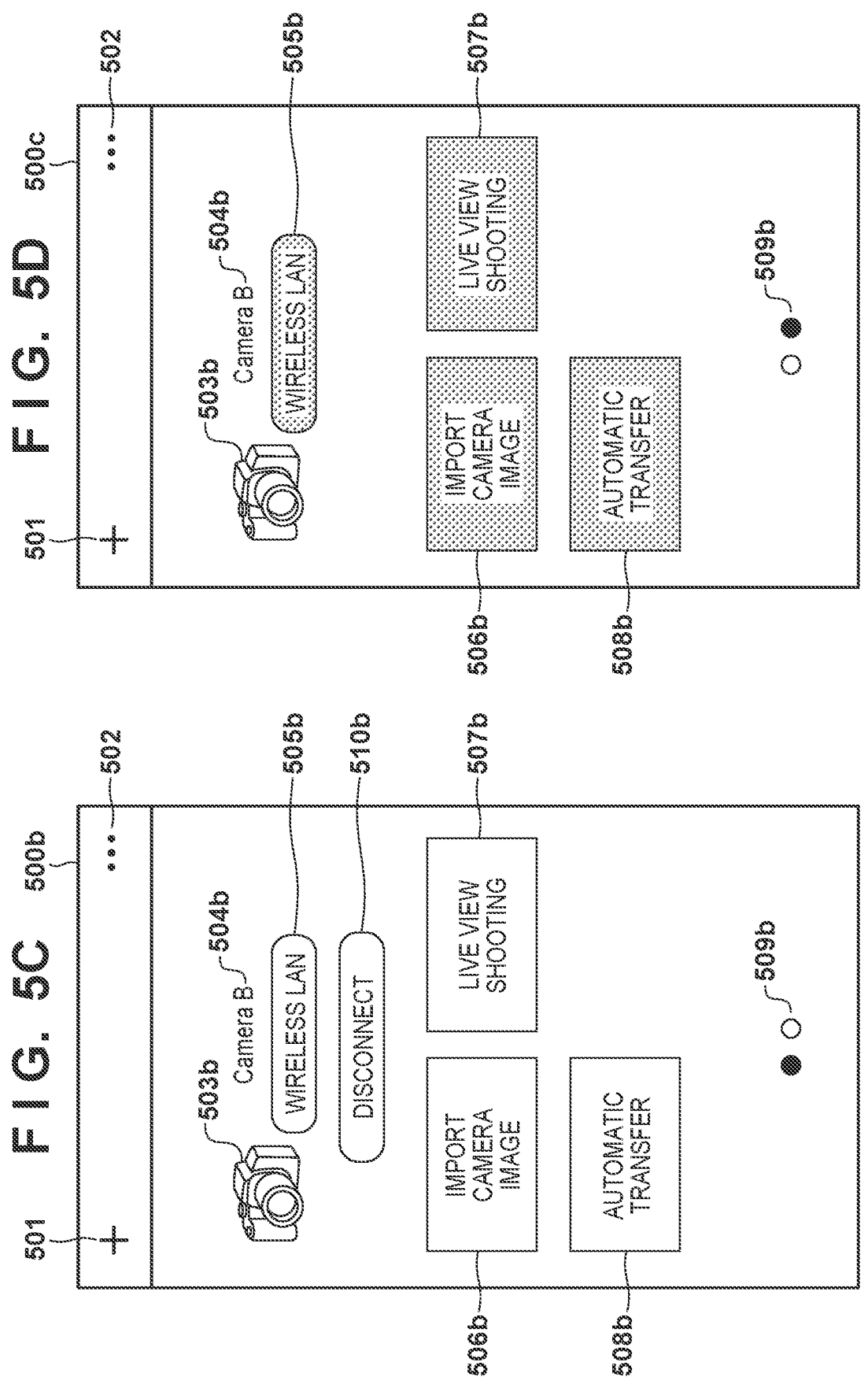

F I G. 6

| INDEX | NICKNAME | IDENTIFICATION INFORMATION |
|---|---|---|
| 1 | Camera A | 11-22-33-44-55-66 |
| 2 | Camera B | 77-88-99-00-11-22 |
| 3 | Camera C | 12-34-56-78-90-12 |

601          602          603

F I G.  7
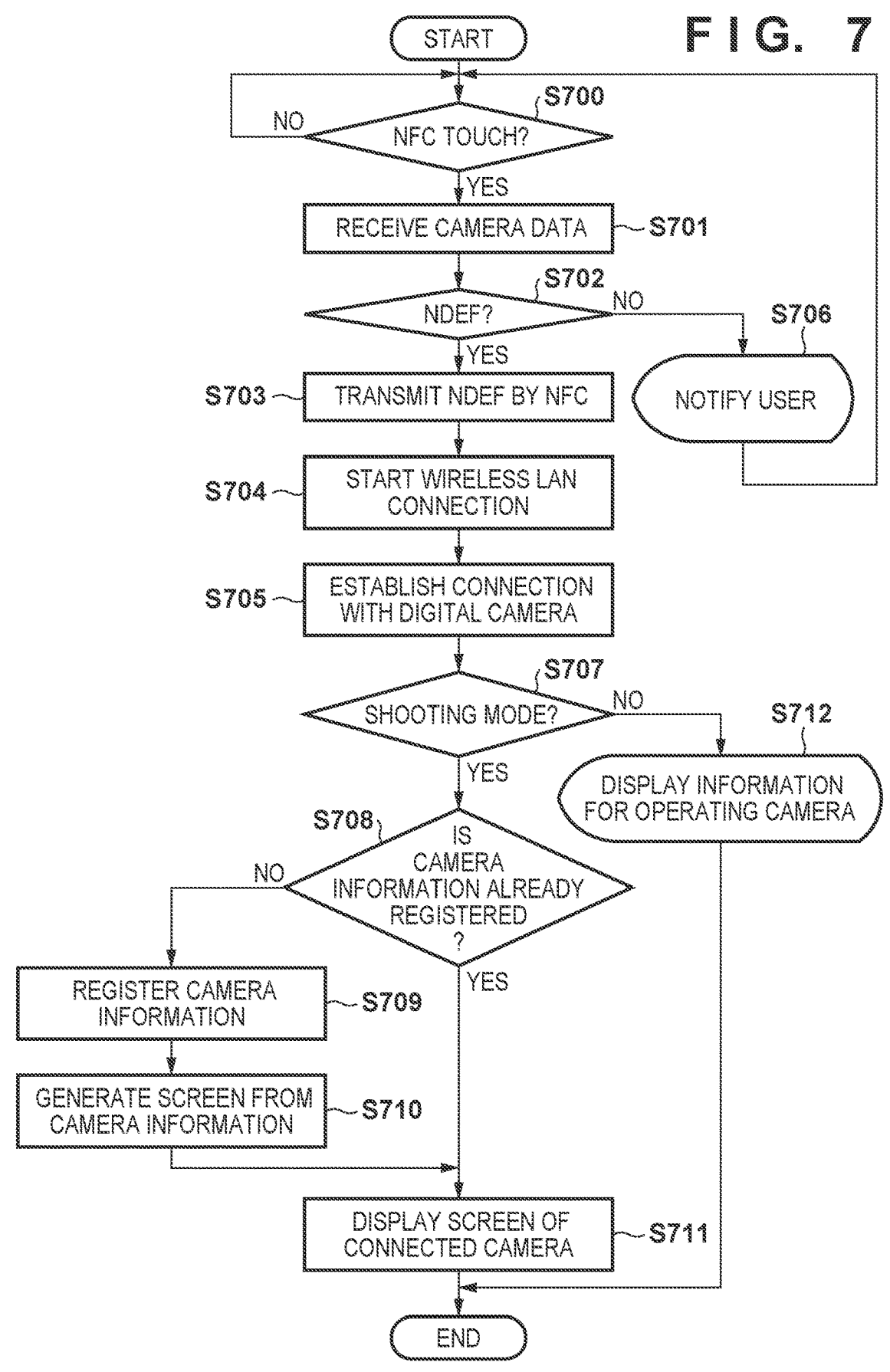

COMMUNICATION APPARATUS AND CONTROL METHOD

BACKGROUND OF THE INVENTION

Field of the Invention

The present invention relates to techniques for connecting a communication apparatus to an external apparatus to be able to wirelessly communicate with each other.

Description of the Related Art

Handover is known as a technique for connecting an image capture apparatus such as a digital camera to a communication apparatus such as a mobile device to be able to wirelessly communicate with each other. Handover is a technique that simplifies connection operations by using a short-distance wireless communication method such as Near Field Communication (NFC) or Bluetooth® to obtain information (SSID, password, etc.) for connecting the communication apparatus to an access point (AP) such as a wireless Local Area Network (LAN) from the image capture apparatus.

Regarding image capture apparatuses, functions that are executable after a wireless LAN connection is established are different depending on the operation state when a connection with a communication apparatus via handover is started. For example, as described in Japanese Patent Laid-Open No. 2016-42656, when the operation state of an image capture apparatus when handover is started is reproduction mode, a function that enables the transfer of images from the image capture apparatus to a communication apparatus immediately after connection is executable.

The communication apparatus is provided with a function that generates a screen for operating the image capture apparatus and executing functions by recording information of an image capture apparatus that has previously been connected or obtaining information from a newly connected image capture apparatus. In this case, the information of the image capture apparatus is saved in the communication apparatus even after the image capture apparatus is disconnected.

However, when the connection via handover is a temporary connection for sharing images with a third party, such as in the case of the reproduction mode in Japanese Patent Laid-Open No. 2016-42656, conceivably, there is no need to save the information of the image capture apparatus in the communication apparatus and no need to display the information on a screen.

SUMMARY OF THE INVENTION

The present invention has been made in consideration of the aforementioned problems, and realizes techniques enabling control of the saving and displaying of information of an image capture apparatus in a communication apparatus depending on the operation state of the image capture apparatus when connected to the communication apparatus.

In order to solve the aforementioned problems, the present invention provides a communication apparatus comprising: a first communication unit that is connectable to an external apparatus via a first wireless communication method; a second communication unit that is connectable to the external apparatus via a second wireless communication method different from the first wireless communication method; and a control unit that, on a basis of predetermined information obtained from the external apparatus via the first communication unit, connects to the external apparatus via the second communication unit and generates operation information for operating the external apparatus on a basis of the predetermined information, wherein the control unit, on a basis of an operation state of the external apparatus at a time when the external apparatus is connected via the second communication unit on a basis of the predetermined information, performs control to store the predetermined information and generate the operation information or generate the operation information without storing the predetermined information.

In order to solve the aforementioned problems, the present invention provides a method of controlling a communication apparatus comprising: wherein the communication apparatus includes, a first communication unit that is connectable to an external apparatus via a first wireless communication method, and a second communication unit that is connectable to an external apparatus via a second wireless communication method different from the first wireless communication method, and wherein the method includes, on a basis of predetermined information obtained from an external apparatus via the first communication unit, controlling for connecting to the external apparatus via the second communication unit and for generating operation information for operating the external apparatus on a basis of the predetermined information, and in the controlling, on a basis of an operation state of the external apparatus at a time when the external apparatus is connected via the second communication unit on a basis of the predetermined information, performing control to store the predetermined information and generate the operation information or generate the operation information without storing the predetermined information.

In order to solve the aforementioned problems, the present invention provides a non-transitory computer-readable storage medium storing a program for causing a computer to function as a communication apparatus comprising: a first communication unit that is connectable to an external apparatus via a first wireless communication method; a second communication unit that is connectable to the external apparatus via a second wireless communication method different from the first wireless communication method; and a control unit that, on a basis of predetermined information obtained from the external apparatus via the first communication unit, connects to the external apparatus via the second communication unit and generates operation information for operating the external apparatus on a basis of the predetermined information, wherein the control unit, on a basis of an operation state of the external apparatus at a time when the external apparatus is connected via the second communication unit on a basis of the predetermined information, performs control to store the predetermined information and generate the operation information or generate the operation information without storing the predetermined information.

According to the present invention, control can be performed of the saving and displaying of information of an image capture apparatus in a communication apparatus depending on the operation state of the image capture apparatus when connected to the communication apparatus.

Further features of the present invention will become apparent from the following description of exemplary embodiments (with reference to the attached drawings).

BRIEF DESCRIPTION OF THE DRAWINGS

FIG. 1A is a block diagram illustrating a configuration of a digital camera according to a present embodiment.

FIG. 1B is a front view illustrating the configuration of the digital camera according to the present embodiment.

FIG. 1C is a back view illustrating the configuration of the digital camera according to the present embodiment.

FIG. 3 is a block diagram illustrating a software configuration of a mobile device according to the present embodiment.

FIGS. 5A to 5D are diagrams illustrating examples of screens of a camera communication application of the mobile device according to the present embodiment.

FIG. 6 is a diagram illustrating an example of a data configuration of registered camera information according to the present embodiment.

FIG. 7 is a flowchart illustrating processing by the mobile device according to the present embodiment.

DESCRIPTION OF THE EMBODIMENTS

Figure 2:
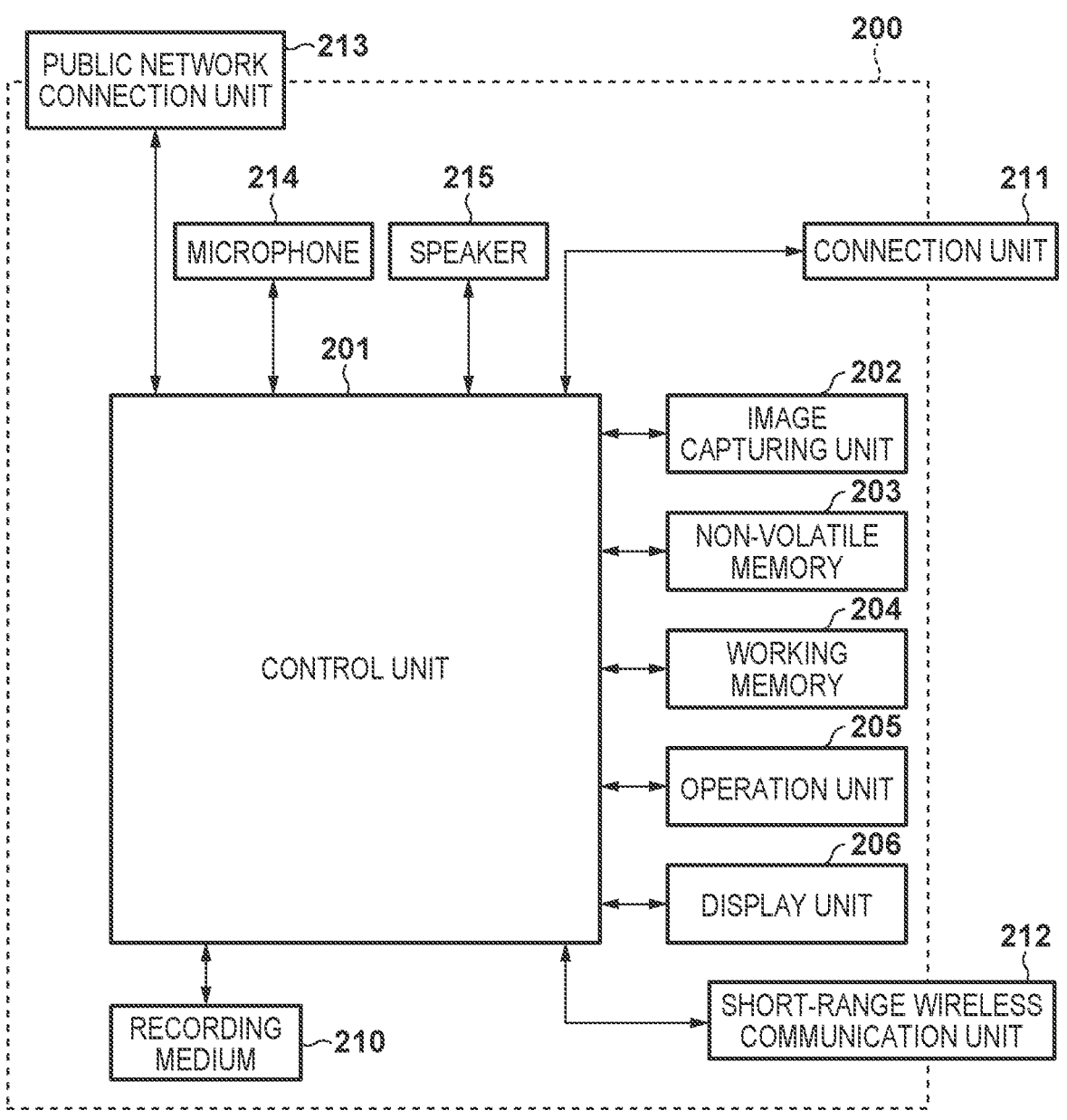
FIG. 2 is a block diagram illustrating a hardware configuration of a mobile device according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A system in which a communication apparatus and an image capture apparatus are connectable by a wireless communication method according to the present embodiment will be described below.

Note that the communication apparatus according to the present embodiment includes a smartphone, a tablet computer, a smartwatch, smart glasses, or other smart device or mobile device. However, no such limitation is intended, and the communication apparatus may be an information processing apparatus such as a personal computer with a wireless communication function or an image capture apparatus such as a digital camera. Also, the image capture apparatus according to the present embodiment is not limited to being a digital camera and may be a smart device with a camera function and a wireless communication function or a mobile device.

Also, in the present embodiment described below, the communication apparatus is applied to a mobile device and the image capture apparatus is applied to a digital camera. Also, when the mobile device is the communication apparatus, the communication partner digital camera is an external apparatus, but when the digital camera is the communication apparatus, the communication partner mobile device is an external apparatus.

In the present embodiment described below, processing is executed for controlling the saving and displaying of the information of a digital camera 100 and a mobile device 200 depending on the operation state of the digital camera 100 when the mobile device 200 is connected without the user being aware of it.

Configuration of Digital Camera 100

First, the configuration and function of the digital camera 100 according to the present embodiment will be described with reference to FIG. 1A.

A control unit 101 is an arithmetic processing unit (CPU) that controls the entire digital camera 100 and implements communication processing and control processing described below by executing a program stored in a non-volatile memory 103 described below. Note that instead of the control unit 101 controlling the entire apparatus, a plurality of hardware may share the processing to control the entire apparatus.

An image capturing unit 102 includes a lens group including a zoom lens and a focus lens and a shutter with a diaphragm function. Also, the image capturing unit 102 includes an image sensor constituted by a CCD or CMOS element or the like that converts an object image into an electrical signal and an A/D converter that converts an analog image signal output from the image sensor into a digital signal. The image capturing unit 102, via control by the control unit 101, converts, via the image sensor, object image light formed by the lens included in the image capturing unit 102 into an electrical signal, performs noise reduction processing and the like, and outputs image data based on the digital signal.

The control unit 101 executes pixel interpolation, resize processing to reduce size, and color conversion processing on image data captured by the image capturing unit 102. Also, the control unit 101 compresses and encodes still image data on which an image processing has been given using JPEG or the like or encodes moving image data via a moving image compression method, such as MPEG2 or H.264, and generates an image file, which is then recorded in a recording medium 110. In the digital camera 100 of the present embodiment, the image data is recorded in the recording medium 110 in accordance with Design rule for Camera File system (DCF) standards. Also, the control unit 101 performs predetermined arithmetic processing using the captured image data and executes automatic focus (AF) processing and automatic exposure (AE) processing by the control unit 101 controlling the focus lens, the diaphragm, and the shutter of the image capturing unit 102 on the basis of the obtained calculation result.

The non-volatile memory 103 is a memory which is electrically erasable and recordable. The memory such as EEPROM is used as the non-volatile memory 103, for example. Constants, programs, and the like for operation of the control unit 101 are recorded in the non-volatile memory 103. Herein, programs refer to programs for executing control processing described below in the present embodiment.

Constants and variables for operation of the control unit 101 and programs read out from the non-volatile memory 103 are loaded on a working memory 104 used as a work area. Also, the working memory 104 is used as buffer memory that temporarily stores image data captured by the image capturing unit 102 or an image display memory for a display unit 106.

An operation unit 105 includes operation members such as various types of switches, buttons, and dials for accepting various operations from a user. The operation unit 105 includes, for example, a power button for turning on and off the power supply, a shutter button for giving a shooting instruction of an image, a reproduction button for giving a reproduction instruction of an image, and a mode button for changing the operation mode of the digital camera 100. Also, the operation unit 105 includes a dedicated connection button for starting communications with an external apparatus such as the mobile device 200 described below. Furthermore, the operation unit 105 includes a touch panel that is integrally configured with the display unit 106 described below.

The shutter button turns on halfway through the operation, or in other words when half pressed (a shooting preparation instruction), and generates a first shutter switch signal SW1. In response to the first shutter switch signal SW1, the control unit 101 starts operations such as automatic focus (AF) processing, automatic exposure (AE) processing, automatic white balance (AWB) processing, and pre-flash emission (EF) processing by controlling the image capturing unit 102. Also, the shutter button turns on when the operation of the shutter button is completed, or in other words when fully pressed (a shooting instruction), and generates a second shutter switch signal SW2. In response to the second shutter switch signal SW2, the control unit 101 starts a series of shooting processing operations from reading out a signal from the image capturing unit 102 to writing the image data on the recording medium 110.

The display unit 106 performs displays of live view images, displays of shot images, displays of characters for interactive operations, and the like. The display unit 106 is constituted by a display device such as a liquid crystal display or an organic EL display, for example. The display unit 106 may be integrally formed with the digital camera 100 or may be an external apparatus connected to the digital camera 100. The digital camera 100 is only required to be able to connect the display unit 106 and control the display of the display unit 106.

The recording medium 110 is used to record image files generated by the control unit 101 or to read out image files already recorded on the recording medium 110 by the control unit 101. The recording medium 110 may be a memory card or a hard disk drive installed in the digital camera 100 or may be a flash memory or a hard disk drive built-in the digital camera 100. The digital camera 100 is only required to be able to access the recording medium 110.

The digital camera 100 of the present embodiment has a shooting mode for shooting images and a reproduction mode for displaying images on the display unit 106. In the reproduction mode, image files recorded on the recording medium 110 are read out and displayed on the display unit 106. The image files recorded on the recording medium 110 can be not only images shot by the digital camera 100, but also, for example, images shot by an external apparatus to which the recording medium 110 is attached, or images received from an external apparatus via the connection unit 111 described below.

The reproduction mode includes two submodes. The submodes include a single reproduction mode in which one image is displayed on the full screen of the display unit 106 and a multi-reproduction mode in which a plurality of images are displayed on the full screen of the display unit 106. Note that the number of images displayed in the multi-reproduction mode can be changed by a user operation. The user can operate a dial included in the operation unit 105, display a total of nine images in a 3×3 pattern, or display a total of 25 images in a 5×5 pattern. Note that the operation member for changing the number of images in the multi-reproduction mode may also function as the zoom lever. With this configuration, when the zoom lever is operated to the zoom-in side, the number of images displayed is increased, and when the zoom lever is operated to the wide-angle side, the number of images displayed is decreased. With such a configuration, the user is provided with a more intuitive operating experience. Note that when the number of images displayed reaches a predetermined number and the zoom lever is further operated to the zoom-in side, the mode transitions from the multi-reproduction mode to the single reproduction mode. Conversely, when the number of images displayed reaches a predetermined number and the zoom lever is further operated to the wide-angle side, the mode transitions from the single reproduction mode to the multi-reproduction mode.

A connection unit 111 includes a communication interface for wirelessly communicating with an external apparatus. The digital camera 100 of the present embodiment is capable of transmitting and receiving data with an external apparatus via the connection unit 111. For example, image data generated by the image capturing unit 102 may be transmitted to an external apparatus via the connection unit 111. Note that in the present embodiment, the connection unit 111 includes an antenna and a communication circuit for communicating via a wireless LAN with an external apparatus in accordance with IEEE 802.11 standards. The control unit 101 implements wireless communication with an external apparatus by controlling the connection unit 111. Note that the communication method is not limited to a wireless LAN, and other methods may include a wireless communication interface such as an infrared communication interface or a wireless USB.

The connection unit 111 of the digital camera 100 according to the present embodiment includes an access point (AP) mode for operating as an access point in the infrastructure mode and a client (CL) mode for operating as a client in infrastructure mode. Also, when the connection unit 111 operates in CL mode, the digital camera 100 of the present embodiment is capable of operating as a CL device in infrastructure mode. When the digital camera 100 is operating as a CL device, the digital camera 100 is capable of joining a network created by an AP device by connecting to an AP device nearby. Also, when the connection unit 111 operates in AP mode, the digital camera 100 of the present embodiment is capable of operating as a simple AP (hereinafter, simple AP), which is a type of AP with limited functionality. When the digital camera 100 operates as a simple AP, the digital camera 100 itself creates a network. A device near the digital camera 100 can recognize the digital camera 100 as an AP device and join the network created by the digital camera 100. Whether the digital camera 100 is operated in AP mode or CL mode can be determined and controlled by the control unit 101 based on information obtained from the mobile device 200 by a short-range wireless communication unit 112 described below. The program for operating the digital camera 100 in AP mode or CL mode is stored in the non-volatile memory 103.

Note that although the digital camera 100 according to the present embodiment is a type of AP, it is a simple AP without a gateway function for transferring data received from a CL device to an internet provider or the like. Accordingly, the digital camera 100 is not capable of transferring data received from an external apparatus joined to the network created by the digital camera 100 to a network such as the Internet.

A short-range wireless communication unit 112, for example, includes an antenna for wireless communication and a modulation/demodulation circuit and a communication controller for processing wireless signals. The short-range wireless communication unit 112 mainly acts as a Target. The short-range wireless communication unit 112 outputs a modulated wireless signal from the antenna and demodulates a wireless signal received by the antenna. In this manner, non-contact proximity-based communication in accordance with ISO/IEC 18092 standards (that is, Near Field Communication (NFC)).

When the short-range wireless communication unit 112 is connected to an external apparatus and a data read-out request is received from the external apparatus, the short-range wireless communication unit 112 outputs transmission data to the external apparatus on the basis of communication information stored in the non-volatile memory 103.

The communication information stored in the non-volatile memory 103 has a data configuration compliant with the NFC Data Exchange Format (NDEF) and includes information (SSIDs and passwords) for when the digital camera 100 is the simple AP mode, information such as the MAC address of the digital camera 100, camera-specific information, function information, and the like. The NDEF data configuration according to the present embodiment will be described below using FIG. 6. Note that the storage destination of the communication information is not limited to the non-volatile memory 103, and the communication information may be stored in a non-volatile memory provided in the short-range wireless communication unit 112, for example.

Note that the communication information is not limited to the NDEF and may be originally defined using binary data compliant with a Tag format defined by the NFC forum and stored.

Also, at the timing of when writing is performed by the short-range wireless communication unit 112 from the external apparatus to the non-volatile memory 103, the control unit 101 determines whether to operate in AP mode or in CL mode and establishes a wireless LAN connection with the external apparatus. At the timing of when the wireless LAN connection with the external apparatus is established, the control unit 101 returns the communication information stored in the non-volatile memory 103 to the pre-writing state. Note that the timing of when the communication information stored in the non-volatile memory provided in the short-range wireless communication unit 112 is returned to the pre-writing state is not limited, and the communication information may be returned when the wireless LAN connection is disconnected, for example.

The digital camera 100 according to the present embodiment starts communicating with and connects to the mobile device 200 by the short-range wireless communication unit 112 being brought close to a short-range wireless communication unit 212 of the mobile device 200. Note that when the short-range wireless communication unit 112 is used to connect, the short-range wireless communication units 112 and 212 do not need to be brought into contact with one another. Since the short-range wireless communication units 112 and 212 can communicate when separated a certain distance, to connect the two, the short-range wireless communication units 112 and 212 only need to be brought within a range in which short-range wireless communication is able to be performed. Hereinafter, being brought within a range in which short-range wireless communication is able to be performed is referred to as "being brought close to one another".

Also, while the short-range wireless communication units 112 and 212 are out of the range in which short-range wireless communication is able to be performed, communication is not started. When the short-range wireless communication units 112 and 212 are in the range in which short-range wireless communication is able to be performed and the devices are communicatively connected, the connection is disconnected and communication stops if the short-range wireless communication units 112 and 212 are moved out of the range in which short-range wireless communication is able to be performed. Note that the non-contact proximity-based communication implemented by the short-range wireless communication units 112 and 212 is not limited to NFC, and a non-contact proximity-based communication compliant with the ISO/IEC 14443 standards may be used.

In the present embodiment, the communication speed achieved by the connection unit 111 is faster than the communication speed achieved by the short-range wireless communication unit 112. Also, the communication by the connection unit 111 is able to be performed in a wider range than the communication by the short-range wireless communication unit 112. On the other hand, with the communication by the short-range wireless communication unit 112, since the communication partner can be restricted by the narrow communicable range, processing is not required for exchanging encryption keys required for communication by the connection unit 111 and the like. In other words, communication can be more easily performed than when the connection unit 111 is used.

Next, the configuration of the external appearance of the digital camera 100 will be described with reference to FIGS. 1B and 1C.

The operation unit 105 includes operation members including a shutter switch 105a, a reproduction button 105b, a directional key 105c, and a touch panel 105d. The antenna of the short-range wireless communication unit 112 is provided on the side surface of the camera body of the digital camera 100 according to the present embodiment. Short-range wireless communication is established with an external apparatus by bringing the short-range wireless communication unit of the external apparatus close to the short-range wireless communication unit 112. In this manner, the digital camera 100 can communicate with an external apparatus in a non-contact manner without using a cable or the like, and the communication partner can be restricted to the external apparatus intended by the user.

Hardware Configuration of Mobile Device 200

Next, the hardware configuration of the mobile device 200 according to the present embodiment will be described with reference to FIG. 2.

The mobile device 200 of the present embodiment has a control unit 201, an image capturing unit 202, a non-volatile memory 203, a working memory 204, an operation unit 205, a display unit 206, a recording medium 210, a connection unit 211, and the short-range wireless communication unit 212. The basic functions of these elements are the same as in the digital camera 100, and thus the description will be omitted.

An operating system (OS), which is fundamental software executed by the control unit 201, and applications that cooperate with the OS to implement extended functions are recorded in the non-volatile memory 203. Also, in the present embodiment, a camera communication application for communicating with the digital camera 100 is stored in the non-volatile memory 203.

The processing of the mobile device 200 of the present embodiment is implemented by reading software provided by an application. Note that the application includes software for using the basic function of the OS installed in the mobile device 200. Also, the OS of the mobile device 200 may include software for implementing the control processing according to the present embodiment.

The connection unit 211 includes an antenna and a communication circuit for wirelessly communicating with an external apparatus such as the digital camera 100. The control unit 201 implements wireless communication with an external apparatus by controlling the connection unit 211. Note that the connection unit 211 may be directly connected to the digital camera 100 or may be connected via an access point. As the protocol for communicating data, Picture Transfer Protocol over Internet Protocol (PTP/IP) via a wireless LAN may be used, for example. Note that the communication with the digital camera 100 is not limited thereto. For example, the connection unit 211 may include a wireless communication interface such as an infrared communication interface, Bluetooth communication module, or a wireless USB.

When the short-range wireless communication unit 212 receives a data read-out request from the external apparatus, the short-range wireless communication unit 212 outputs response data on the basis of the communication information stored in the non-volatile memory 203. In the present embodiment, the mobile device 200 operates in the card reader mode, the card writer mode, and the P2P mode as defined in NFC standards via the short-range wireless communication unit 212 and mainly acts as an Initiator.

A public network connection unit 213 is an interface used when wireless communication is performed via a wide area network (WAN), such as 4G/LTE, 5G, or the like. The mobile device 200 is capable of calling an external apparatus and communicating data via the public network connection unit 213. When calling, the control unit 201 performs input and output of audio signal via a microphone 214 and a speaker 215. In the present embodiment, the public network connection unit 213 is not limited to 4G/LTE and 5G and other communication method, such as Local 5G, WiMAX, ADSL, or FTTH may be used. In the present embodiment, the public network connection unit 213 is an antenna, and the control unit 201 can connect to the public network via the antenna. Note that the connection unit 211 and the public network connection unit 213 are not required to be configured by independent hardware and may be implemented by sharing a single antenna, for example.

Software Configuration of Mobile Device

Next, the software configuration of the mobile device 200 according to the present embodiment will be described with reference to FIG. 3.

Various fixed data and firmware are recorded in the non-volatile memory 203.

An operating system (OS) 304, which is the basic software executed by the control unit 201, and an image import application 301 included in the camera communication application executed by the control unit 201 are recorded in the recording medium 210.

The image import application 301 is a program for performing a wireless LAN connection on the basis of wireless LAN information relating to a wireless LAN network created by the digital camera 100 obtained by short-range wireless communication with the digital camera 100 and connecting to the connection unit 111 of the digital camera 100. Also, the image import application 301 is a program for receiving image data stored in the recording medium 110 of the digital camera 100 and recording the image data in the recording medium 210.

When the user turns on the power switch included in the operation unit 205, operation of the mobile device 200 is started, the control unit 201 reads out the OS 304 from the recording medium 210, loads the OS 304 on the working memory 204, and successively loads and executes the OS 304. Also, the various components of the mobile device 200 are controlled according to the OS 304 and applications installed on the OS. In the present embodiment, the control unit 201 executing predetermined processing according to an application (or a function of an application, the OS, an OS service, or the like) is referred to as "the application executing predetermined processing". Note that instead of the control unit 201 controlling the entire mobile device 200, the various components of the mobile device 200 may be controlled by the processing being shared between a plurality of pieces of hardware.

The OS 304 is not only provided with a function for controlling the various components of the mobile device 200 but also provides various types of services relating to applications. In the present embodiment, the OS 304 is provided with an NFC service 305 and a wireless LAN service 308.

The NFC service 305 performs NFC data communication in response to a query for data wanted to be obtained by the image import application 301 via short-range wireless communication or data wanted to be written via short-range wireless communication. Also, the NFC service 305 can determine and analyze the NFC data structure, change the data structure to an appropriate data structure, and pass this to an application.

An NFC tag analysis 306 of the NFC service 305 can execute processing to determine the NFC data structure, determine whether or not the NFC data structure is compliant with the NDEF, and pass this to an application. Also, even if the NFC data structure is not compliant with the NDEF, the information can be passed to an application if the tag format is defined in the NFC forum.

For example, in the Android (registered trademark) OS, the result of the NFC tag analysis 306 can be passed to the application using a mechanism called intent for connecting the OS and applications. When the result of the NFC tag analysis 306 is determined by the Android OS to be NDEF, a "NDEF_DISCOVERED" character string and data relating thereto are included in an intent, and this can be passed to an application. Also, when the result is determined to be no NDEF but a format defined in the NFC forum, a "TECH_DISCOVERED" character string and data relating thereto are included in an intent, and this can be passed to an application. In other cases, the Android OS includes a "TAG_DISCOVERED" character string and data relating thereto in an intent and passes this to an application.

An NFC communication management 307 of the NFC service 305 executes processing to exchange NFC data via the short-range wireless communication unit 212.

The wireless LAN service 308 executes processing to manage on/off of the wireless LAN, scanning for SSIDs, joining an SSID, communication via the wireless LAN, saving and deleting of wireless LAN information of the image import application 301, and the like.

Wireless LAN information recording 309 of the wireless LAN service 308 performs recording or deleting of wireless LAN information of the image import application 301.

Wireless LAN communication management 310 of the wireless LAN service 308 joins a detected wireless LAN when the wireless LAN information stored in the recording medium 210 and the detected wireless LAN information match and performs communication via the wireless LAN. Also, the wireless LAN communication management 310 of the wireless LAN service 308 acts as an intermediary for the exchange of data obtained via the wireless LAN connection between applications, controls the on/off of the wireless LAN by applications, and the like.

Wireless LAN service control 302 of the image import application 301 executes processing to record wireless LAN information and command the OS 304 regarding the on/off of the wireless LAN.

NFC service control 303 of the image import application 301 executes processing to receive NFC data, analyze the received data, and extract wireless LAN information. The NFC service control 303 also executes processing to transmit to the OS 304 NFC data for advancing the connection processing relating to the digital camera 100.

Figure 4:
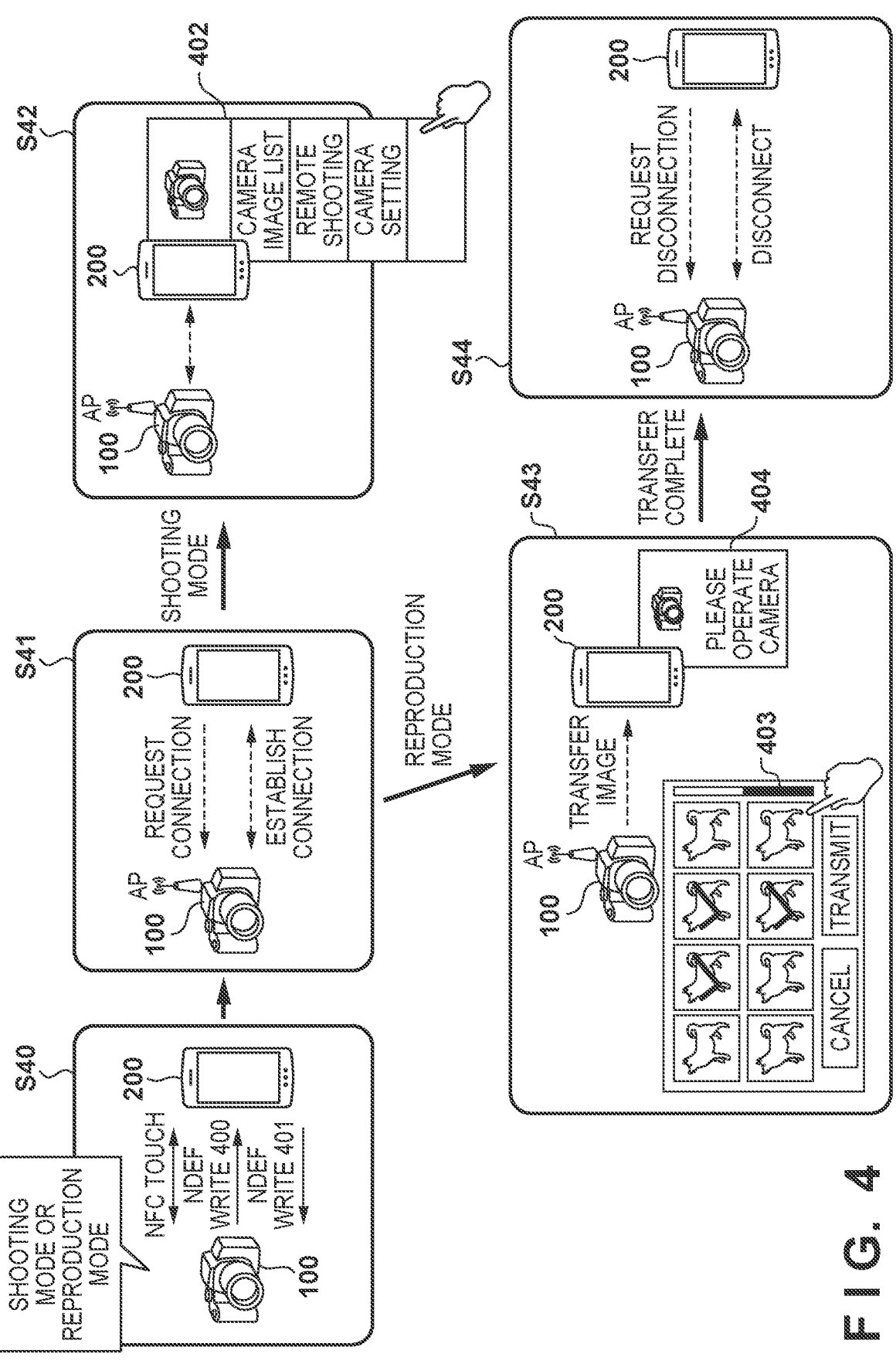
FIG. 4 is a diagram illustrating the processing by the digital camera and the mobile device at the timing of when a handover is started according to the present embodiment.

Processing by Digital Camera 100 and Mobile Device 200 at Timing of when Handover is Started Next, the processing by the digital camera 100 and the mobile device 200 at the timing of when handover is started according to the present embodiment will be described with reference to FIG. 4.

In the present embodiment described below, the OS 304 of the mobile device 200 is the Android OS.

Hereinafter, the processing (steps S40 and S41) until a wireless LAN connection is made by the digital camera 100 and the mobile device 200 via handover from NFC to wireless LAN will be described. Also, the processing (steps S42 to S44) after the wireless LAN connection according to the mode of the digital camera 100 at the timing of when handover is started will be described.

First, the handover from NFC to wireless LAN in steps S40 and S41 will be described.

In step S40, to start the handover from NFC to wireless LAN, the user brings the short-range wireless communication unit 112 of the digital camera 100 and the short-range wireless communication unit 212 of the mobile device 200 close together (hereinafter, referred to as an NFC touch) to start short-range wireless communication.

The digital camera 100 transmits NDEF data (NDEF writing 400) including camera information and wireless LAN information to the mobile device 200 via the short-range wireless communication unit 112. As a response, the mobile device 200 transmits NDEF data (NDEF writing 401) including mobile device information to the digital camera 100 via the short-range wireless communication unit 212.

The camera information includes camera-specific information including the camera model ID and model name, identification information (Universally Unique Identifier (UUID)), information of the functions of the camera, and the like. The wireless LAN information includes the SSID and password of the access point of the wireless LAN network and the camera MAC address created by the simple AP function of the digital camera 100. Also, the mobile device information includes mobile-device-specific information including the device name and identification information (UUID) of the mobile device and the like.

In step S41, the digital camera 100 starts up simple AP based on the wireless LAN information transmitted to the mobile device 200 in step S40. The mobile device 200 connects to the simple AP started up by the digital camera 100, and a wireless LAN connection is established.

Next, an example will be described in which, in steps S42 to S44, the processing executed after the wireless LAN connection is different depending on the operation state of the digital camera 100 at the timing of when the handover from NFC to wireless LAN is started.

When the digital camera 100 is in a shooting mode at the timing of when the handover from NFC to wireless LAN is started in step S40, the state indicated in step S42 is transitioned to. In this case, the digital camera 100 is in a shooting mode. Thus, shooting can be performed, and a reproduction mode can be transitioned to visually inspect shot images. The mobile device 200 generates and displays a screen 402 that enables various functions for the digital camera 100 to be executed including camera image list, remote shooting, and camera settings. By the user selecting from the camera image list on the screen 402, a list of images recorded on the recording medium 110 of the digital camera 100 can be displayed, and an image selected from the list of images can be imported from the digital camera 100. Also, by the user selecting remote shooting on the screen 402, shooting can be performed via remote control of the digital camera 100.

Note that when the digital camera 100 is in the shooting mode at the timing of when the digital camera 100 is connected to the mobile device 200, the information of the connected mobile device 200 is stored in the non-volatile memory 103. Also, the mobile device 200 also stores the information of the connected digital camera 100 in the non-volatile memory 203.

This use case assumes that the same digital camera and the mobile device are mainly used for personal use and often connected together. Thus, by storing each other's device information, the input operation and the like can be omitted when reconnected.

When the digital camera 100 is in the reproduction mode at the timing of when the handover from NFC to wireless LAN is started in step S40, the state indicated in step S43 is transitioned to. In this case, the digital camera 100 displays a list screen 403 of images stored in the recording medium 110 on the display unit 106 and transitions to an image transfer mode. In the image transfer mode, the user can select any images by operating the digital camera 100 and transfer the selected images to the connected mobile device 200. The mobile device 200 generates and displays a screen 404 including a message notifying the user to operate the digital camera 100.

In step S43, when the user operates the digital camera 100 and the image transfer to the mobile device 200 is completed, the state indicated in step S44 is transitioned to. In this case, the mobile device 200 transmits a disconnect request to the digital camera 100 via the connection unit 211, and the connection with the digital camera 100 is disconnected.

When the digital camera 100 is in the reproduction mode at the timing of when the digital camera 100 is connected to the mobile device 200, no information of the connected mobile device 200 is stored. Also, the mobile device 200 stores no information of the connected digital camera 100.

This use case assumes that the shot images will mainly be shared with other people. Thus, image transfer can be performed via a temporary connection without storing device information in either device.

In this manner, without the user being aware of the purpose such as personal use or sharing images with others, the functions executable after the wireless LAN connection can be selectively used depending on the operation state of the digital camera 100 at the timing of when the handover from NFC to wireless LAN is started.

Screen of Mobile Device 200

Next, a screen provided by a camera communication application of the mobile device 200 according to the present embodiment will be described with reference to FIGS. 5A to 5D.

The camera communication application of the mobile device 200 according to the present embodiment registers the connected digital camera and generates a screen as operation information, that is a Graphical User Interface (GUI) or the like, for enabling the operation and the execution of functions of each registered digital camera. The user can perform an operation to switch screens per digital camera.

Registering a digital camera and generating a screen will be described below with reference to FIGS. 5A and 5D.

Figure 5B:
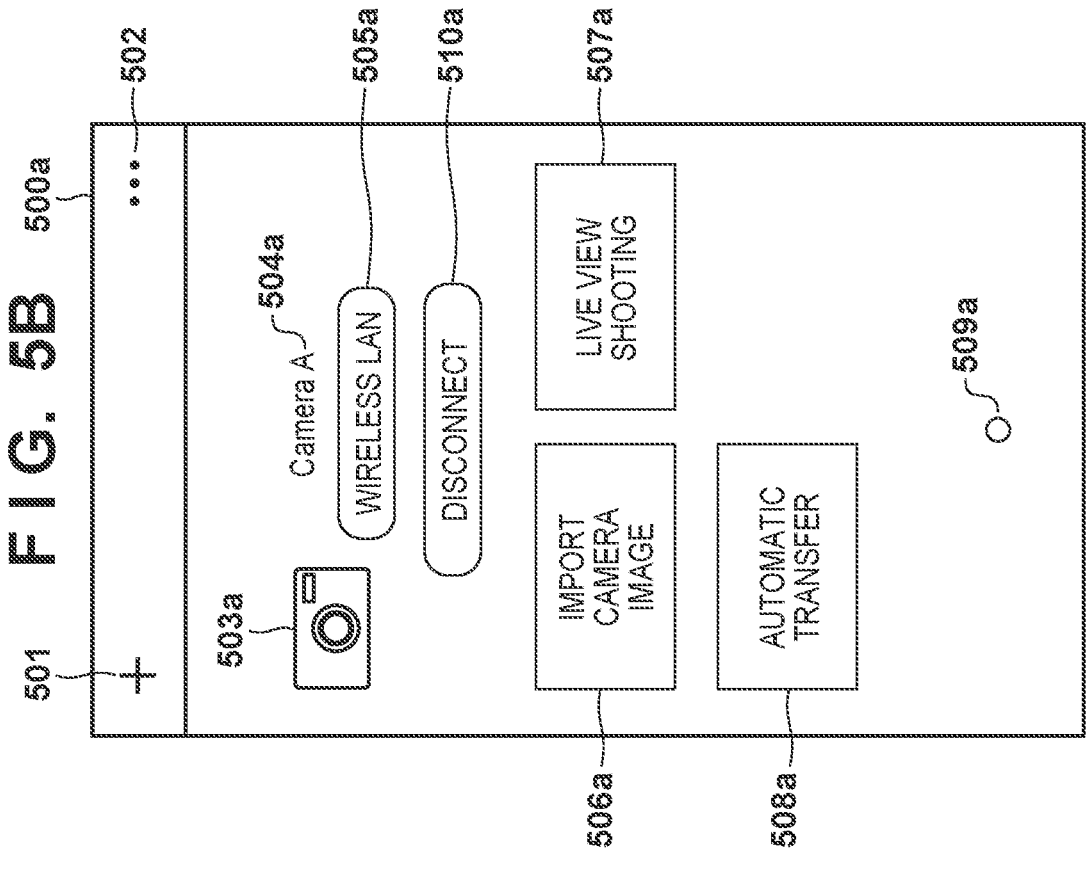
Figure 5A:
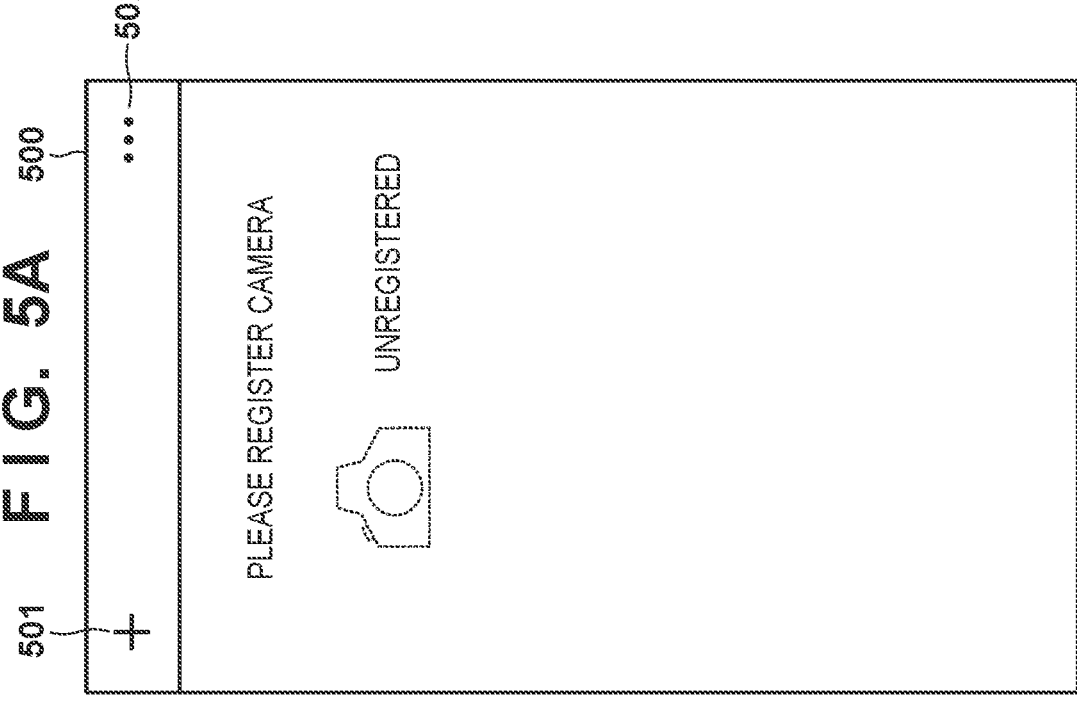

FIG. 5A is a diagram illustrating an example of a screen 500 displayed when not even one digital camera is registered in the camera communication application of the mobile device 200.

A registration button 501 is a button for registering a digital camera in the camera communication application. When the user operates the registration button 501 and performs a predetermined operation to newly connect a digital camera, the information of the digital camera to be connected is registered in the camera communication application, and a screen for the registered digital camera is added to the camera communication application.

A confirm button 502 is a button for displaying a list of the information of the digital cameras registered in the camera communication application.

In the state illustrated in FIG. 5A, when the user operates the registration button 501 and a digital camera A and the mobile device 200 are connected via wireless LAN, the digital camera A is registered in the camera communication application. The control unit 201 adds the camera information of the digital camera A to the registered camera information stored in the non-volatile memory 203 and newly generates a screen 500a illustrated in FIG. 5B. Note that registered camera information will be described below using FIG. 6.

FIG. 5B is a diagram illustrating an example of the screen 500a displayed when the digital camera A is connected via wireless LAN.

An image illustrating the connected digital camera is displayed in an image display portion 503a. In FIG. 5B, an image of the external appearance of the digital camera A is displayed.

An identification name of the connected digital camera is displayed in a name display portion 504a. As illustrated in FIG. 5B, the nickname of the digital camera A is read out from the registered camera information described below using FIG. 6 and displayed.

The connection state between the digital camera A and the mobile device 200 is displayed in a connection state display portion 505a. In the present embodiment, a mark indicating the connection-via-wireless-LAN state is displayed in the connection state display portion 505a.

In this example, a wireless LAN mark is displayed in a bright color while the digital camera A and the mobile device 200 are connected via wireless LAN.

Function buttons 506a to 508a are buttons that are executable when the digital camera A and the mobile device 200 are in a connected state.

The function button 506a is a button for executing the function of displaying an image recorded in the recording medium 110 of the connected digital camera A on the display unit 206.

The function button 507a is a button for executing the function of receiving a live view image from the connected digital camera A and displaying the live view image on the display unit 206 and executing the live view shooting function that enables shooting instructions to be sent to the digital camera A.

The function 508a is a button for setting the automatic transmission function settings for automatically transmitting a captured image to the mobile device 200 at the timing of when the user operates the shutter switch of the operation unit 105 of the digital camera A.

The function buttons 506a to 508a described above may be displayed in either an enabled state or a disabled state depending on the connection state between the digital camera A and the mobile device 200.

In the example in FIG. 5B, the digital camera A and the mobile device 200 are connected via wireless LAN.

The functions corresponding to the function buttons 506a to 508a can be executed while the digital camera A and the mobile device 200 are connected via wireless LAN.

A page display portion 509a indicates the number of digital cameras registered in the camera communication application and the position of the screen of the currently displayed digital camera. In the present embodiment, the position of the screen of the currently displayed digital camera is indicated with a white dot, and the position of the screen of another digital camera is indicated by a black dot. In this example, the position of the screen of the digital camera A corresponds to an index of the registered camera information described below using FIG. 6.

A disconnect button 510a is a button for disconnecting the wireless LAN connection between the digital camera A and the mobile device 200. While the digital camera A and the mobile device 200 are connected via wireless LAN, the disconnect button 510a is displayed. When the disconnect button 510a is operated, the control unit 201 transmits a disconnect wireless LAN connection request to the digital camera A. When the control unit 101 of the digital camera A receives the disconnect wireless LAN connection request from the mobile device 200, the control unit 101 stops the AP mode operation and terminates the created network. In this manner, the wireless LAN connection between the digital camera A and the mobile device 200 can be disconnected.

In the state illustrated by the example in FIG. 5B, only the digital camera A is registered in the camera communication application.

Next, an example in which, from the state illustrated in FIG. 5B, a digital camera B is added and registered in the camera communication application will be described.

From the state illustrated in FIG. 5B, when the user operates the registration button 501 and the digital camera B and the mobile device 200 are connected via wireless LAN, the digital camera B is registered in the camera communication application. The control unit 201 adds the camera information of the digital camera B to the registered camera information stored in the non-volatile memory 203 and newly generates and displays a screen 500b illustrated in FIG. 5C. FIG. 5C is a diagram illustrating an example of the screen 500b generated when the digital camera B is connected via wireless LAN. Display components 503b to 510b included on the screen 500b are similar to the display components 503a to 510a in FIG. 5A except that the digital camera in question is the digital camera B.

Also, in the example illustrated in FIG. 5C, the digital camera A and the digital camera B are registered in the camera communication application. In this case, in the camera communication application, the screen 500a and the screen 500b have been generated. When the user drags the screen left and right via the operation unit 205, the control unit 201 switches between displaying the screen 500a (FIG. 5A) of the digital camera A and the screen 500b (FIG. 5C) of the digital camera B on the display unit 206. In this manner, by switching the displayed screen, the user can select the digital camera to be operated by the camera communication application and execute the desired function.

In the page display portion 509*b*, two circles are displayed indicating that two digital cameras are registered and that two corresponding screens have been generated. The position of the screen of the currently displayed digital camera B is indicated by a white dot. In this example, the position of the screen of the digital camera B corresponds to an index of the registered camera information described below using FIG. 6.

From the state illustrated in FIG. 5C, when the disconnect button 510*b* is operated or the user performs an operation to disconnect the wireless LAN connection for the digital camera B, the digital camera B terminates the created network, and the wireless LAN connection between the digital camera B and the mobile device 200 is disconnected. In this case, a screen 500*c* illustrated in FIG. 5D is displayed. The wireless LAN mark for a connection state display portion 505*b* is displayed in a dark color indicating a non-connected state. Also, function buttons 506*b* to 508*b* are displayed in a dark color indicating a disabled state due to not being connected to the digital camera B via wireless LAN.

Examples of four functions corresponding to the function buttons 506*a* and *b* to 508*a* and *b* have been described above, but the functions are not limited thereto. As long as the function relates to the registered digital camera, any function may be used. Other examples include changing the settings of a registered digital camera, linking to an external site for the instruction manual, and the like. Also, in the example described above, the digital camera A and the digital camera B can execute the same functions, but the functions that can be executed may differ between the digital cameras, and the number of functions that can be executed may also differ. In such cases, on the screen of each digital camera, function buttons corresponding to the functions that can be executed by the digital camera are displayed.

Data Configuration of Registered Camera Information

Next, the data configuration of registered camera information stored in the non-volatile memory 203, that is information of the digital camera 100 connected to the mobile device 200 via wireless LAN, will be described with reference to FIG. 6.

The registered camera information is information relating to the digital camera 100 connected to the mobile device 200 via wireless LAN managed by the mobile device 200 and includes an index 601, a nickname 602, and identification information 603.

The index 601 corresponds to a numerical value assigned to each registered camera.

The nickname 602 corresponds to a character string indicating the nickname set for the digital camera 100.

The identification information 603 corresponds to information for identifying the digital camera 100. In the present embodiment, the identification information 603 is a wireless LAN MAC address character string.

A MAC address is a hardware-specific number held by the network interface of a computing device. The wireless LAN MAC address according to the present embodiment refers to a MAC address allocated to the connection unit 111 of the digital camera 100.

Note that the identification information 603 is not limited thereto, and it is sufficient that the identification information 603 is information, such as the serial number of the digital camera 100, that enables the digital camera to be uniquely identified.

The mobile device 200 obtains a wireless LAN MAC address from the digital camera 100 at the timing of when the connection with the digital camera 100 is established.

The mobile device 200 compares the identification information 603 of the registered camera information read out from the non-volatile memory 203 and the wireless LAN MAC address obtained by the digital camera 100.

When registered camera information including the identification information 603 that matches the wireless LAN MAC address obtained from the digital camera 100 is not present, the nickname and the wireless LAN MAC address obtained from the digital camera 100 is stored in the non-volatile memory 203 as registered camera information. In other words, when a connection is established with a different digital camera, the number of items of registered camera information increases. Also, when the same digital camera 100 is reconnected, the nickname 602 is updated for the registered camera information in which the wireless LAN MAC address obtained from the digital camera 100 and the identification information 603 match.

When the digital camera 100 is in the shooting mode at the timing of when the mobile device 200 is connected to the digital camera 100, a screen already registered in the camera communication application based on the registered camera information of the digital camera 100 that has been previously connected is displayed or a screen generated on the basis of information obtained from a newly connected digital camera is displayed.

Also, when the digital camera 100 is in the reproduction mode at the timing of when the mobile device 200 is connected to the digital camera 100, a screen is displayed notifying the user to operate the digital camera 100 without registering the information of the connected digital camera 100 in the registered camera information.

Control Processing According to the Present Embodiment

It has been described above that depending on the operation state of the digital camera at the timing when a handover from NFC to wireless LAN is started, the functions executable after the wireless LAN connection are different, and thus depending on the executable functions, the saving of the information of each other's device and the displaying of the information on the screen are controlled.

In particular, when the digital camera 100 is in the reproduction mode at the timing of when a handover from NFC to wireless LAN is started and the connected digital camera 100 is a newly connected digital camera, in the mobile device 200, there is no need to register the newly connected digital camera in the registered camera information and no need to display the information of the digital camera 100 on a screen.

This is because, when the digital camera 100 is in the reproduction mode at the timing of when the handover from NFC to wireless LAN is started, it is assumed that the shot images will be shared with other people and the purpose is to transfer images via a temporary connection without requiring the information of the digital camera 100 to be stored in each device.

In the example described below, control processing is executed for the mobile device 200 and the digital camera 100 for a case including image transfer via a temporary connection such as in the case in which a handover from NFC to wireless LAN is started when the digital camera 100 is in the reproduction mode.

Processing of Mobile Device 200

Next, the control processing when the digital camera 100 and the mobile device 200 are connected via a handover from NFC to wireless LAN according to the present embodiment will be described with reference to the flowchart in FIG. 7.

Note that the processing in FIG. 7 is implemented by a program stored in the non-volatile memory 203 being executed by the control unit 201 of the mobile device 200 and the components of the mobile device 200 being controlled.

In step S700, the control unit 201 determines whether or not an NFC touch with the digital camera 100 has been performed via the short-range wireless communication unit 212. When the control unit 201 determines that an NFC touch has been performed, the control unit 201 proceeds the processing to step S701, otherwise the control unit 201 continues the processing until the control unit 201 determines that an NFC touch has been performed.

In step S701, the control unit 201 receives camera data from the short-range wireless communication unit 112 of the digital camera 100 that has been brought close via the short-range wireless communication unit 212. The camera data include camera information, wireless LAN information, the camera operation state (reproduction mode or shooting mode), and the like.

In step S702, the OS 304 executed by the control unit 201 performs the NFC tag analysis 306 on the camera data received in step S701. When the result of the analysis is a determination of NDEF by the OS 304 (the OS 304 includes a "NDEF_DISCOVERED" character string and data relating thereto in an intent and passes this to an application), the control unit 201 proceeds the processing to step S703. When the determination is not NDEF, the control unit 201 determines that short-range wireless communication has failed and proceeds the processing to step S706.

In step S706, the control unit 201 displays on the display unit 206 that short-range wireless communication has failed so as to notify the user.

In step S703, the control unit 201 transmits NDEF data to the short-range wireless communication unit 112 of the digital camera 100 via the short-range wireless communication unit 212 as a response to the NDEF data received in step S702. Note that the NDEF data transmitted to the digital camera 100 includes the UUID of the mobile device 200, the application ID of the camera communication application, and the device name discretionarily set by the user in the camera communication application.

In step S704, the control unit 201 starts processing to connect to the wireless LAN network of the digital camera 100 on the basis of the camera wireless LAN information received in step S701 via the connection unit 211. In the present embodiment, a high-speed connection to the digital camera 100 is implemented by attempting to connect using the MAC address of the digital camera 100 received in step S701.

In step S705, the control unit 201 establishes a wireless LAN connection with the digital camera 100 using the camera wireless LAN information received in step S701.

In step S707, the control unit 201 references the camera operation state received in step S701 and determines whether or not the digital camera 100 is in the shooting mode. When the control unit 201 determines that the digital camera 100 is in the shooting mode, the control unit 201 proceeds the processing to step S708. When the control unit 201 determines that the digital camera 100 is not in the shooting mode, the control unit 201 proceeds the processing to step S712.

In step S708, the control unit 201 determines whether or not the identification information of the digital camera 100 obtained in step S701 is already registered in the registered camera information by comparing the identification information with the registered camera information stored in the non-volatile memory 203. When the control unit 201 determines that the identification information of the digital camera 100 is not registered in the registered camera information, the processing proceeds to step S709. When the control unit 201 determines that the identification information is already registered, the processing proceeds to step S711. Note that in the present embodiment, a UUID is used as the identification information, but no such limitation is intended, and wireless LAN information, user input information identifying a camera, information specific to the NFC chip installed in the camera, and the like may be used.

In step S709, the control unit 201 registers the identification information of the digital camera 100 obtained in step S701 in the registered camera information stored in the non-volatile memory 103.

In step S710, the control unit 201 generates a screen for operating the camera and executing functions of the camera on the basis of the model ID in the camera information obtained in step S701.

In step S711, the control unit 201 displays a screen corresponding to the connected digital camera 100. In this case, when the preceding step is step S708, a screen has already been generated by the camera communication application and registration has already been performed. Thus, the control unit 201 reads out the corresponding screen on the basis of the model ID of the camera obtained in step S701 and the registered camera information and displays the screen on the display unit 206. When the preceding step is step S710, the control unit 201 displays the screen generated in step S710 on the display unit 206.

In step S712, the control unit 201 determines that the digital camera 100 has been in the reproduction mode at the timing of when the digital camera 100 has been connected and displays on the display unit 206 a screen notifying the user to operate the digital camera 100 without registering the information of the connected digital camera 100 in the registered camera information.

Processing of Digital Camera 100

Next, the control processing when the digital camera 100 and the mobile device 200 are connected via a handover from NFC to wireless LAN according to the present embodiment will be described with reference to the flowchart in FIG. 8.

Figure 8:
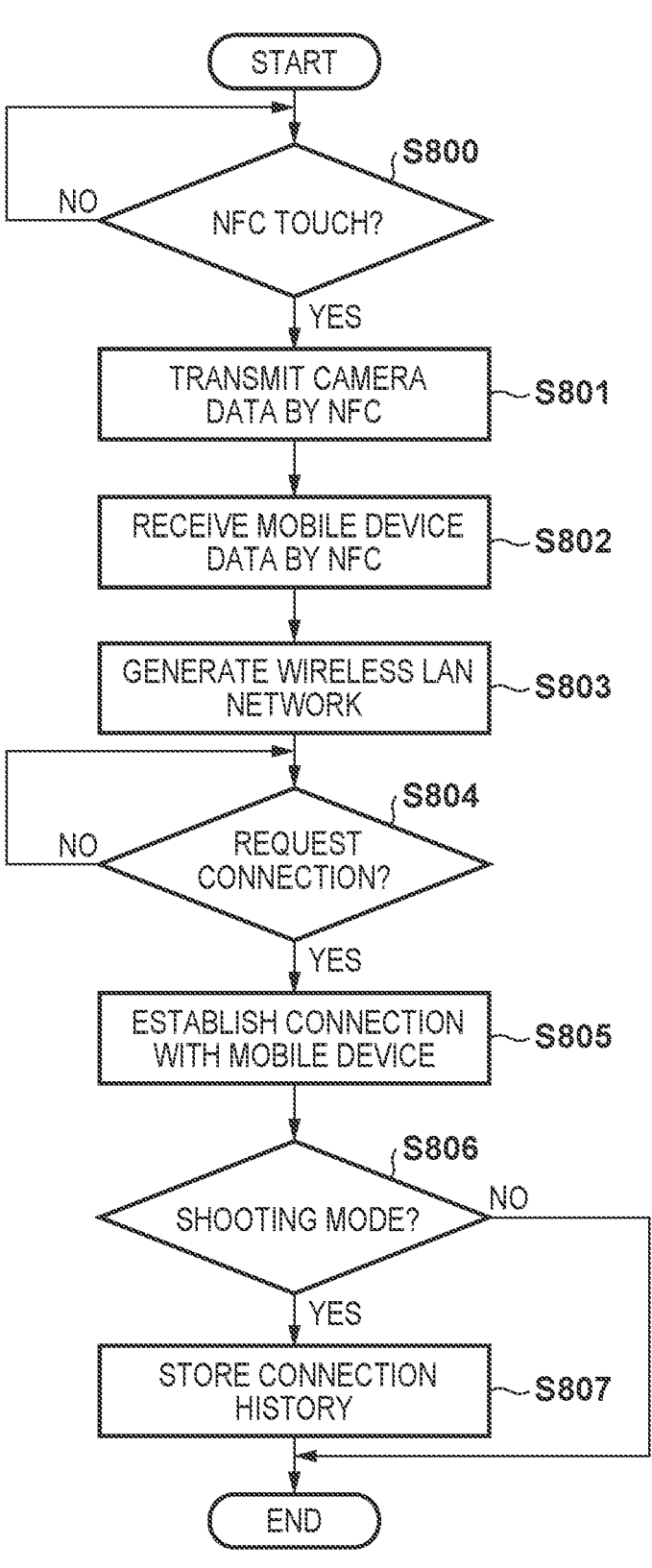
FIG. 8 is a flowchart illustrating processing by a digital camera according to the present embodiment.

Note that the processing in FIG. 8 is implemented by a program stored in the non-volatile memory 103 being executed by the control unit 101 of the digital camera 100 and the components of the digital camera 100 being controlled.

In step S800, the control unit 101 determines whether or not an NFC touch with the mobile device 200 has been performed via the short-range wireless communication unit 112. When the control unit 101 determines that an NFC touch has been performed, the control unit 101 proceeds the processing to step S801, otherwise the control unit 101 continues the processing until the control unit 101 determines that an NFC touch has been performed. In this case, the control unit 101 stores the shooting mode or the reproduction mode as the operation state of the digital camera 100 in the working memory 104.

In step S801, the control unit 101 transmits camera data to the mobile device 200 via the short-range wireless communication unit 112. The camera data include camera information, wireless LAN information, the camera operation state (reproduction mode or shooting mode), and the like.

In step S802, the control unit 101 receives NDEF data (step S703) from the mobile device 200 via the short-range wireless communication unit 112.

In step S803, the control unit 101 creates a wireless LAN network via the simple AP function. In this case, the information relating to the wireless LAN network created by the simple AP function corresponds to the wireless LAN information transmitted to the mobile device 200 in step S801.

In step S804, when the control unit 101 receives a connection request from the mobile device 200 via the connection unit 111 and determines that the mobile device of the received connection request is the mobile device 200 of the NDEF received in step S802, the control unit 101 proceeds with the processing to step S805, or the control unit 101 continues the processing until the control unit 101 determines that a connection request is received.

In step S805, the control unit 101 establishes a wireless LAN connection with the mobile device 200 via the connection unit 111.

In step S806, the control unit 101 references the operation state of the digital camera 100 stored in the working memory 104 in step S800 and determines whether or not the digital camera 100 is in the shooting mode. When the control unit 101 determines that the operation state of the digital camera 100 is the shooting mode, the processing proceeds to step S807. When the control unit 101 determines that the operation state is not the shooting mode, the processing ends.

In step S807, the control unit 101 stores the information of the digital camera 100 connected via wireless LAN in step S805 in the non-volatile memory 103. The connection history, as described with reference to step S703, includes the UUID of the mobile device 200, the application ID of the camera communication application, and the device name discretionarily set by the user in the camera communication application.

In this manner, according to the present embodiment described above, the saving and displaying of the information of the digital camera 100 and the mobile device 200 can be controlled depending on the operation state of the digital camera 100 when the mobile device 200 is connected without the user being aware of it.

OTHER EMBODIMENTS

The processing in FIG. 7 of the mobile device 200 according to the present embodiment is not limited thereto. As described above, the control unit 201 references the operation state of the digital camera 100 received in step S701, determines whether the digital camera 100 is in the shooting mode, and proceeds to the processing of step S712 when the digital camera 100 is in the reproduction mode. However, the processing may proceed to step S709 instead of step S712. In this case, the control unit 201 executes the processing of steps S709 and S710 and generates a screen corresponding to the connected digital camera. However, the generated screen may be able to be deleted by a user operation or the screen may be displayed and then deleted after a predetermined amount of time has elapsed.

Also, in the present embodiment, as described with reference to steps S705 to S710 in FIG. 7, the mobile device 200 is registered in the registered camera information immediately after wireless LAN connection and a screen is generated, but no such limitation is intended. For example, steps S707 to S711 may be executed at the timing of when the connection between the digital camera 100 and the mobile device 200 is disconnected, the user may register the mobile device 200 in the registered camera information at the timing of disconnection, or steps S707 to S711 may be executed according to the user's intentions after a query asking whether to generate a screen is sent.

Also, in the present embodiment, NFC is used as a first wireless communication method for performing a handover from NFC to wireless LAN, but no such limitation is intended. For example, Bluetooth can be used as the first wireless communication method.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156466, filed Sep. 29, 2022 which is hereby incorporated by reference herein in its entirety.

What is claimed is:

1. A communication apparatus comprising:
a first communication unit that is connectable to an external apparatus via a first wireless communication method;
a second communication unit that is connectable to the external apparatus via a second wireless communication method different from the first wireless communication method;
a storage unit; and
a control unit that, on a basis of predetermined information obtained from the external apparatus via the first communication unit, connects to the external apparatus via the second communication unit and generates operation information for operating the external apparatus on a basis of the predetermined information,
wherein the control unit, on a basis of an operation state of the external apparatus at a time when the external apparatus is connected via the second communication unit on a basis of the predetermined information, performs control to store the predetermined information and generate the operation information or generate the operation information without storing the predetermined information, and wherein the predetermined information includes identification information of the external apparatus, in a case where the operation state is in a first state, the control unit stores the predetermined information in the storage unit as registration information of the external apparatus, and generates first operation information which is a screen for operating the external apparatus based on the registration information, and in a case where the operation state is in a second state, the control unit generates second operation information which is a notification screen prompting the user to operate the external apparatus without storing the predetermined information as registration information of the external apparatus.

2. The apparatus according to claim 1, wherein the control unit deletes the operation information according to a user operation or after a predetermined amount of time has elapsed.

3. The apparatus according to claim 1, wherein in a case where a connection with the external apparatus via the second communication unit is disconnected, the control unit determines whether or not to store the predetermined information.

4. The apparatus according to claim 1, wherein in a case where a connection via the second communication unit is disconnected, the control unit determines whether or not to store the predetermined information according to a user operation.

5. The apparatus according to claim 1, further comprising:

a display unit that displays the first operation information and the second operation information.

6. The apparatus according to claim 1, wherein the second wireless communication method has a faster communication speed and a wider communicable range than the first wireless communication method.

7. The apparatus according to claim 6, wherein the first wireless communication method is Near Field Communication (NFC), and the second wireless communication method is wireless Local Area Network (LAN).

8. The apparatus according to claim 5, wherein the predetermined information includes information of a function of the external apparatus, and information for connecting to a wireless LAN network created by the external apparatus.

9. The apparatus according to claim 1, wherein the external apparatus is an image capture apparatus, the first state is a shooting mode, and the second state is a reproduction mode.

10. The apparatus according to claim 9, wherein in a case where an operation state of the image capture apparatus at a time when the image capture apparatus is connected to the communication apparatus via the second communication unit is the reproduction mode, the image capture apparatus does not store information obtained from the communication apparatus via the first communication unit.

11. A method of controlling a communication apparatus, wherein the communication apparatus includes, a first communication unit that is connectable to an external apparatus via a first wireless communication method, a second communication unit that is connectable to an external apparatus via a second wireless communication method different from the first wireless communication method, and a storing unit, the method comprising:

on a basis of predetermined information obtained from an external apparatus via the first communication unit, connecting to the external apparatus via the second communication unit and for generating operation information for operating the external apparatus on a basis of the predetermined information, and on a basis of an operation state of the external apparatus at a time when the external apparatus is connected via the second communication unit on a basis of the predetermined information, performing control to store the predetermined information and generate the operation information or generate the operation information without storing the predetermined information, and wherein the predetermined information includes identification information of the external apparatus, in a case where the operation state is in a first state, storing the predetermined information in the storage unit as registration information of the external apparatus and generating first operation information which is a screen for operating the external apparatus based on the registration information, and in a case where the operation state is in a second state, generating second operation information which is a notification screen prompting the user to operate the external apparatus without storing the predetermined information as registration information of the external apparatus.

12. A non-transitory computer-readable storage medium storing a program for causing a computer to function as a communication apparatus comprising:

a first communication unit that is connectable to an external apparatus via a first wireless communication method;

a second communication unit that is connectable to the external apparatus via a second wireless communication method different from the first wireless communication method;

a storage unit; and a control unit that, on a basis of predetermined information obtained from the external apparatus via the first communication unit, connects to the external apparatus via the second communication unit and generates operation information for operating the external apparatus on a basis of the predetermined information, wherein the control unit, on a basis of an operation state of the external apparatus at a time when the external apparatus is connected via the second communication unit on a basis of the predetermined information, performs control to store the predetermined information and generate the operation information or generate the operation information without storing the predetermined information, and wherein the predetermined information includes identification information of the external apparatus, in a case where the operation state is in a first state, the control unit stores the predetermined information in the storage unit as registration information of the external apparatus, and generates first operation information which is a screen for operating the external apparatus based on the registration information, and in a case where the operation state is in a second state, the control unit generates second operation information which is a notification screen prompting the user to operate the external apparatus without storing the predetermined information as registration information of the external apparatus.

\* \* \* \* \*